United States Patent [19]

Larson et al.

[11] Patent Number: 5,796,822

[45] Date of Patent: Aug. 18, 1998

[54] PORTABLE ELECTRONIC DEVICE HAVING A ROTATABLE EARPIECE

[75] Inventors: Kenneth Warren Larson, Elmhurst; Leonid Soren, Lincolnwood; Daniel L. Williams, Vernon Hills, all of Ill.

[73] Assignee: Motorola, Inc., Schaumburg, Ill.

[21] Appl. No.: 802,826

[22] Filed: Feb. 19, 1997

[51] Int. Cl.$^6$ .............................. H04M 1/00; H04B 1/38
[52] U.S. Cl. .................. 379/433; 379/428; 379/433; 379/434; 455/90
[58] Field of Search ................... 379/428, 433, 379/434; 455/90

[56] References Cited

U.S. PATENT DOCUMENTS

| D. 285,200 | 8/1986 | Bressler et al. | D14/53 |
|---|---|---|---|
| 5,177,784 | 1/1993 | Hu et al. | 379/430 |
| 5,189,632 | 2/1993 | Paajanen et al. | 379/106.02 |
| 5,235,560 | 8/1993 | Seager | 368/10 |
| 5,260,998 | 11/1993 | Takagi | 379/433 |
| 5,301,224 | 4/1994 | Major | 379/58 |
| 5,511,120 | 4/1996 | Hirata | 379/433 |
| 5,668,867 | 9/1997 | Nagai | 379/433 |

FOREIGN PATENT DOCUMENTS

| 0472361A2 | 2/1992 | European Pat. Off. |
| 4306036 | 10/1992 | Japan |

Primary Examiner—Krista Zele
Assistant Examiner—Benny Q. Tieu
Attorney, Agent, or Firm—John J. Oskorep

[57] ABSTRACT

A mobile station (102) comprises a body (106), a display (112), a keypad (114), a retractable antenna (108), a microphone (116), and a rotatable earpiece (110). The body (106) defines a front surface (118), a first side edge (122), a second side edge (124), a top end (126), and a bottom end (128). The display (112) and the keypad (114) are outwardly directed from the front surface (118). The microphone (116) is outwardly directed from the first side edge (122) and positioned near the bottom end (128). The retractable antenna (108) extends from the top end (126) and is positioned along an axis of the second side edge (124). The rotatable earpiece (110) is rotatably mounted along an axis of the first side edge (122) and positioned near the top end (126). When in a first position, the rotatable earpiece (110) is substantially planar with the body (106) and outwardly directed away from the front surface (118). When in a second position, the rotatable earpiece (110) is outwardly directed away from the first side edge (122).

19 Claims, 2 Drawing Sheets

5,796,822

1

PORTABLE ELECTRONIC DEVICE HAVING A ROTATABLE EARPIECE

FIELD OF THE INVENTION

This invention relates generally to portable electronic devices having transducers, and more particularly to portable communication devices having earpieces.

BACKGROUND OF THE INVENTION

Throughout the years, technological advances have assisted in decreasing the size of portable electronic devices such as personal digital assistants (PDAs) and cellular telephones. Although such advancements are generally desirable for portability and wearability of such devices, they may actually compromise some important ergonomic features.

For example, it is often desirable to decrease the width of a portable communication device so that a user may grip it comfortably by its left and right sides. However, such width reduction may undesirably decrease the size of a keypad of the device to the extent that its keys are difficult to actuate.

To avoid this problem, it may be desirable to keep the width of the device sufficiently large while substantially reducing the thickness of the device. Here, a user may grip the device comfortably by its front and rear surfaces while listening to audio directed outward from a side edge of the device. However, because of the reduced thickness, a speaker may not be capable of fitting in such direction or may be too small to cover a user's ear for blocking out background noise.

Accordingly, it is desired to provide a portable electronic device that overcomes these and similar deficiencies.

DETAILED DESCRIPTION OF THE PREFERRED EMBODIMENTS

According to the present invention, a portable electronic device comprises a body and a rotatable earpiece. The body defines a front surface and a side edge. The rotatable earpiece is rotatably mounted on the body and is capable of being rotated between a first position and a second position. When in the first position, the rotatable earpiece is outwardly directed away from the front surface. When in the second position, the rotatable earpiece is outwardly directed away from the side edge.

Figure 1:
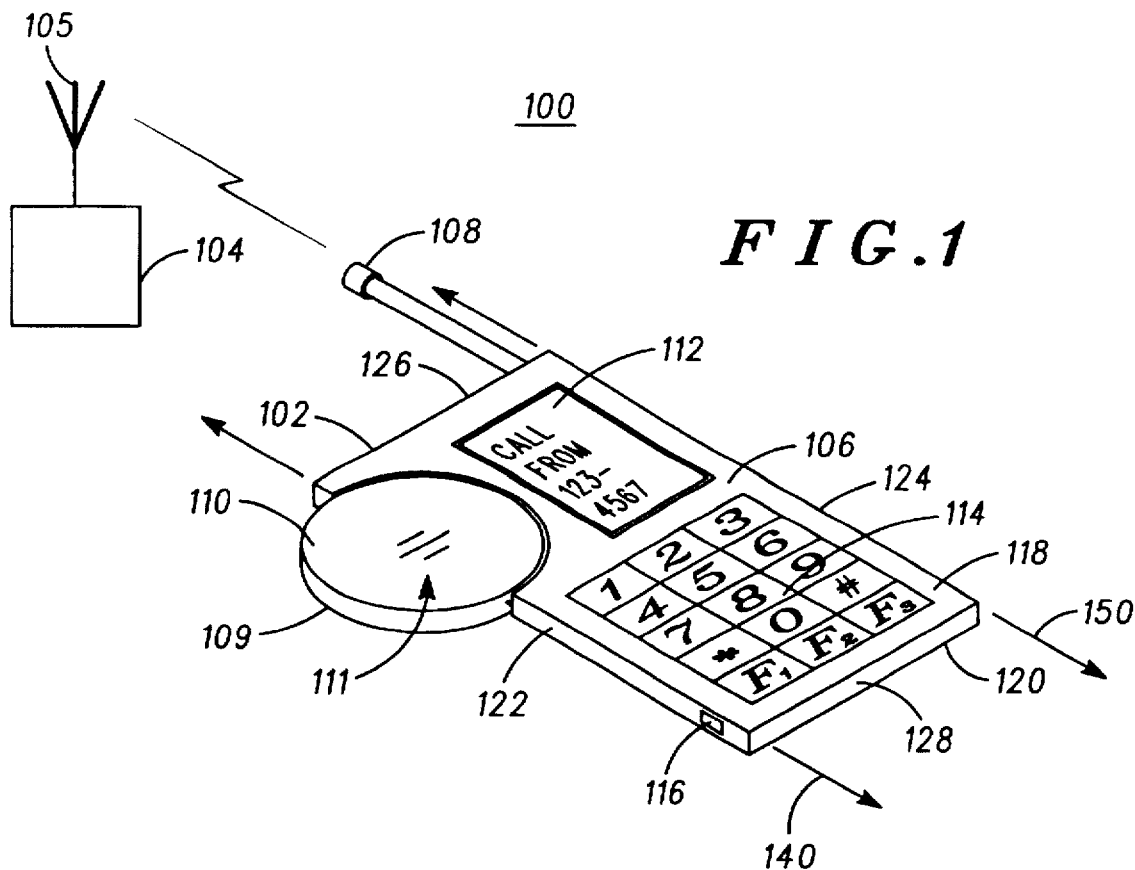
FIG. 1 is a perspective view of a portable communication device of a communication system, the portable communication device having a rotatable earpiece in a first position.

FIG. 1 shows a block diagram illustration of a communication system 100 that includes a mobile station 102 and a base station 104.

Mobile station 102 is a portable communication device which may be more commonly referred to as a radiotelephone. Mobile station 102 comprises a body 106, a retractable antenna 108, a rotatable earpiece 110, a display 112, a keypad 114, a microphone 116, and a battery (not shown) for electrical operation. For portable convenience, body 106 of mobile station 102 is sized to fit within a user's hand.

In communication system 100, mobile station 102 provides telephone communications for a user thereof. Keypad 114 is provided for initiating telephone calls, and rotatable earpiece 110 and microphone 116 are provided for listening and talking, respectively, during telephone communication. Base station 104 is connected to a telephone land line network (not shown). Mobile station 102 and base station 104 wirelessly communicate via radio frequency (RF) signals generated by electrical circuitry of mobile station 102 and base station 104. The RF signals are transmitted to and received from mobile station 102 and base station 104 through retractable antenna 108 and antenna 105, respectively. Thus, two-way voice communication is provided between mobile station 102 and base station 104. Upon receipt of a telephone call, mobile station 102 alerts a user by sounding an audible ringing signal through rotatable earpiece 110.

Examining mobile station 102 in more detail, body 106 defines a front surface 118, a rear surface 120, a first side edge 122, a second side edge 124, a top end 126, and a bottom end 128. In general, body 106 has a rectangular shape and a very small thickness. Display 112 and keypad 114 are disposed within body 106 and are outwardly directed from front surface 118. Microphone 116 is also disposed within body 106 but is outwardly directed from side edge 122 and positioned near bottom end 128. Retractable antenna 108, which is capable of retracting within body 106, extends outwardly from top end 126 along an axis 150 of second side edge 124.

Rotatable earpiece 110 includes a body 109 and a speaker (not visible) disposed within body 109. In the illustrated embodiment, body 109 has a slightly concave outer surface and openings 111 that allow audible sounds from the speaker to pass through body 109. As illustrated, rotatable earpiece 110 has a diameter that is larger than first side edge 122 or the thickness of mobile station 102. Here, rotatable earpiece 110 is sized to cover a portion of a user's ear sufficient to provide good acoustic coupling and to block otherwise audible background noise. Preferably, rotatable earpiece 110 has a diameter in a range of about one to two inches (about 2.5 to 5 cm).

Rotatable earpiece 110 is rotatably mounted on body 106 along side edge 122 near top end 126. More specifically, rotatable earpiece 110 is rotatably mounted with pins (not visible in FIG. 1) positioned along an axis 140 of first side edge 122. Consequently, rotatable earpiece 110 is capable of being rotated between a first position and a second position.

Of course, rotatable earpiece 110 may be fully rotatable about axis 140 (e.g., 360°) or partially rotatable about axis 140 (e.g., limited within boundaries of the first and the second positions). Electrical conductors (not visible), which are used to provide audio signals from the electrical circuitry to the speaker within body 109, are fed through one of the pins that axially mount rotatable earpiece 110.

In FIG. 1, rotatable earpiece 110 is shown in the first position. Here, rotatable earpiece 110 is outwardly directed away from front surface 118. Rotatable earpiece 110 is also substantially planar and flush with body 106. Audible sounds, such as the audible ringing signal sounded when a call is received, can be heard clearly from rotatable earpiece 110, even when rear surface 120 faces downwardly upon a surface.

Figure 2:
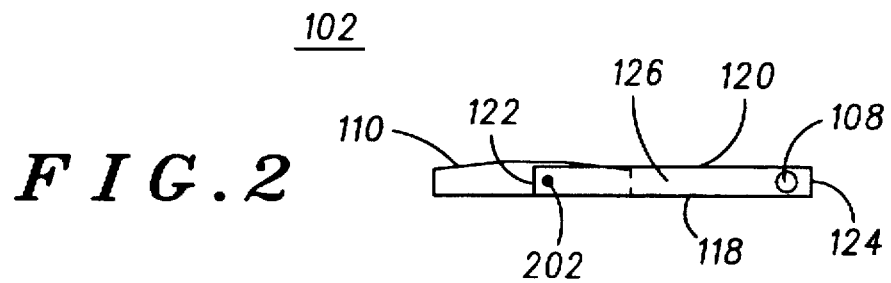
FIG. 2 is a top plan view of the portable communication device with the rotatable earpiece in the first position.

For clarity, FIG. 2 shows a top plan view of mobile station 102 with rotatable earpiece 110 in the first position. FIG. 2 also shows an end of a pin 202 that assists in rotatably mounting rotatable earpiece 110 along axis 140 of first side edge 122. In FIG. 2, it is more readily apparent that rotatable earpiece 110 is substantially planar with body 106. It is also more readily apparent that rotatable earpiece 110 is substantially flush with front surface 118 and rear surface 120.

Figure 5:
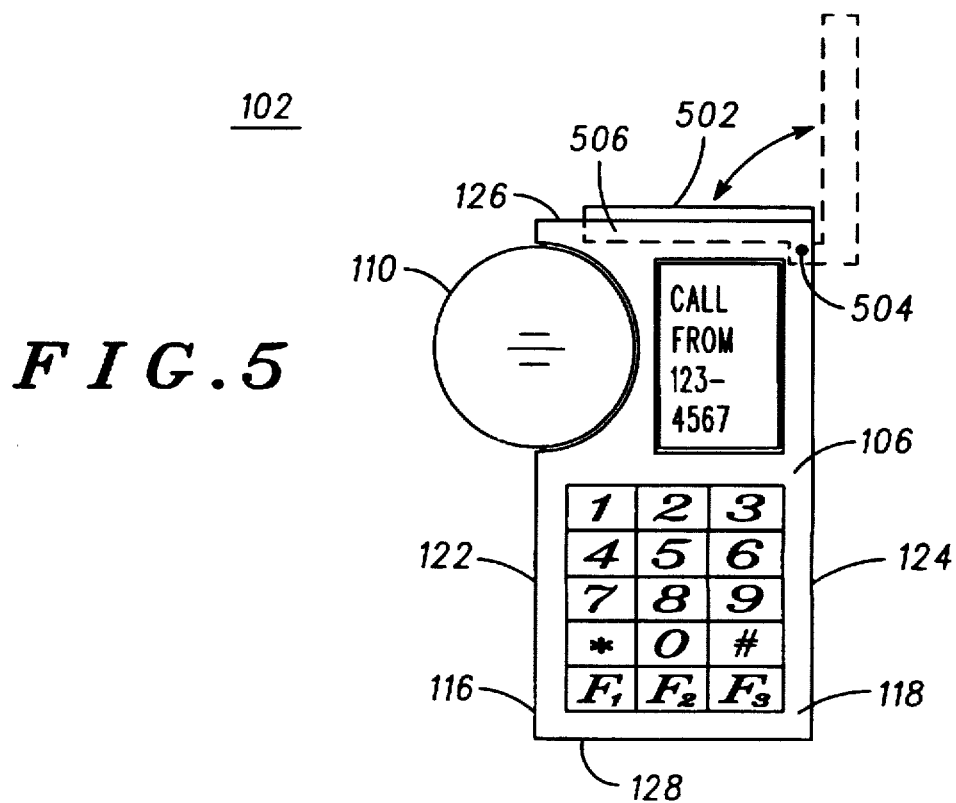
FIG. 5 is a front plan view of the portable communication device with the rotatable earpiece in the first position, where the portable communication device includes a pivotably mounted antenna.

For additional clarity, FIG. 5 shows a front plan view of mobile station 102 also having rotatable earpiece 110 in the first position.

Figure 3:
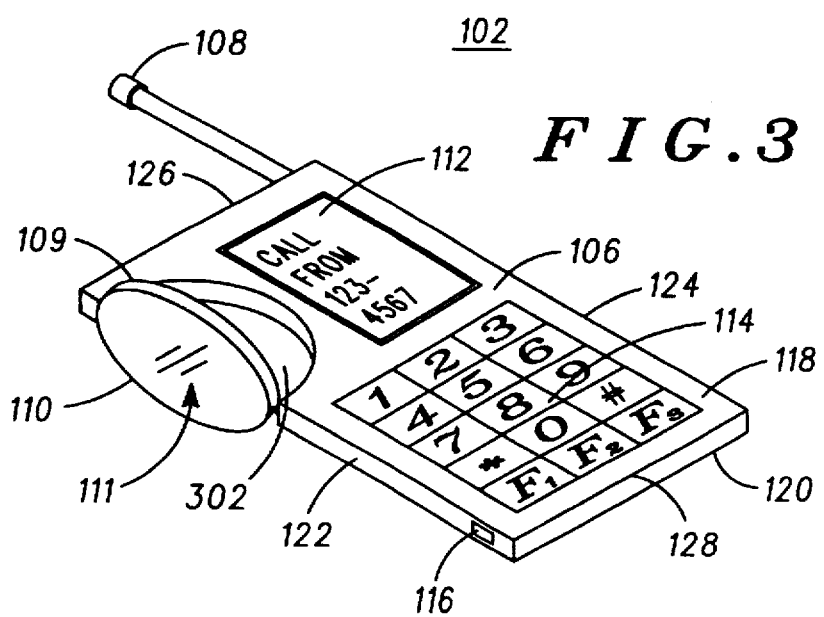
FIG. 3 is a perspective view of the portable communication device with the rotatable earpiece in a second position.

FIG. 3 is a perspective view of mobile station 102 with rotatable earpiece 110 in the second position. Here, rotatable earpiece 110 is outwardly directed away from first side edge 122. In addition, rotatable earpiece 110 is positioned substantially perpendicular to body 106. FIG. 3 also reveals a concave portion of body 106 that defines a hollow area 302 where a portion of rotatable earpiece 110 is disposed within when in the first position.

Figure 4:
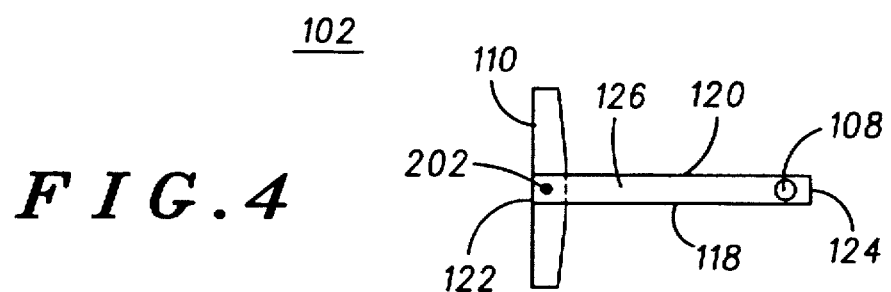
FIG. 4 is a top plan view of the portable communication device with the rotatable earpiece in the second position.

For clarity, FIG. 4 shows a top plan view of mobile station 102 with rotatable earpiece 110 in the second position.

Referring to FIGS. 3 and 4 in combination, mobile station 102 is configured for two-way communications when rotatable earpiece 110 is in the second position. Here, both rotatable earpiece 110 and microphone 116 are outwardly directed away from first side edge 122. A user may comfortably grip mobile station 102 by front and rear surfaces 118 and 120, and place rotatable earpiece 110 adjacent to his ear and microphone 116 near his mouth. As described above, rotatable earpiece 110 is sized to cover a portion of the user's ear sufficient to block otherwise audible background noise. It is also noted that the distance from retractable antenna 108 to a user's head is desirably maximized to reduce interference and improve RF communication.

In an alternate embodiment, rotatable earpiece 110 has a substantially convex outer surface and is sized to fit within a portion of a user's ear. Here, rotatable earpiece 110 preferably has a diameter of about 0.5 inches (about 1.3 cm). In another alternate embodiment, rotatable earpiece 110 is shaped and constructed such that, when in the first position, rotatable earpiece 110 has an earpiece side edge that is substantially flush with first side edge 122. For example, rotatable earpiece 110 could have a semicircular or semielliptical shape, with no portion protruding away from first side edge 122 as shown in FIG. 5.

In the preferred embodiment, when rotatable earpiece 110 is rotated from the first position to the second position, mobile station 102 accepts, answers, or connects an incoming call. That is, such rotation provides an "off-hook" signal to mobile station 102. In addition, when rotatable earpiece 110 is rotated from the second position to the first position, mobile station 102 hangs up or disconnects a connected call. That is, such rotation provides an "on-hook"0 signal to mobile station 102. To provide such electrical operation, mobile station 102 may utilize any suitable detection and/or switching circuitry known in the art.

In an alternate embodiment, when rotatable earpiece 110 is rotated from the first position to the second position, some if not all of the electrical circuitry of mobile station 102 is powered on. Likewise, when rotatable earpiece 110 is rotated from the second position to the first position, some if not all of the electrical circuitry of mobile station 102 is powered off.

Rotatable earpiece 110 could alternatively be a rotatable mouthpiece positioned along axis 140 near bottom end 128. A rotatable mouthpiece would, of course, include a microphone or other suitable transducer. Preferably, mobile station 102 includes both rotatable earpiece 110 and a rotatable mouthpiece, both of which are outwardly directed away from front surface 118 when in a first position and outwardly directed away from first side edge 122 when in a second position. Here, rotatable earpiece 110 and the rotatable mouthpiece move together in joint fashion, both being fixedly attached to a long pin disposed within body 106 along axis 140 of first side edge 122.

In place of retractable antenna 108, mobile station 102 may include a pivotably mounted antenna 502 as shown in FIG. 5. Pivotably mounted antenna 502 is mounted on body 106 with a pin 504.

Pivotably mounted antenna 502 has a first position and a second position, the first position being represented by the solid lines in FIG. 5 and the second position being represented by dashed lines in FIG. 5. In the first position, pivotably mounted antenna 502 is positioned along top end 126 and may be partially or fully embedded within a slot 506 of body 106. In the second position, pivotably mounted antenna 502 extends upwards and outwards away from top end 126.

Preferably, pivotably mounted antenna 502 pivots from the first position to the second position in response to rotatable earpiece 110 being positioned from the first position to the second position. To provide such mechanical operation, mobile station 102 may utilize any suitable mechanism known in the art.

Thus, a portable electronic device having a very thin profile is provided without sacrificing other important ergonomics, such as keypad size and audio quality. Such a thin profile makes a device very easy to carry and to store (such as in a shirt or coat pocket).

While particular embodiments of the present invention have been shown and described, modifications may be made. For example, the portable electronic device could be a personal digital assistant (PDA) or other known device. It is therefore intended in the appended claims to cover all such changes and modifications which fall within the true spirit and scope of the invention.

What is claimed is:

1. A portable electronic device, comprising:
    a body, said body defining a front surface having a side edge, said body defining a hollow area along a portion of said side edge;
    a rotatable earpiece, said rotatable earpiece rotatably mounted on said body along said side edge and rotatable between a first position and a second position, said rotatable earpiece outwardly directed away from said front surface and at least partially disposed in said hollow area when in the first position, said rotatable earpiece outwardly directed away from said side edge and substantially perpendicular to said front surface when in the second position; and
    a microphone, said microphone disposed within said body and outwardly directed from said side edge.

2. The portable electronic device according to claim 1, further comprising:
    a keypad, said keypad carried on said body and outwardly directed from said front surface.

3. The portable electronic device according to claim 1, wherein said rotatable earpiece is substantially flush with said body when in the first position.

4. The portable electronic device according to claim 1, wherein said rotatable earpiece is rotatably mounted along an axis of said side edge, the axis being substantially off-center in relation to a central longitudinal axis of said body.

5. The portable electronic device according to claim 4, further comprising:

a rotatable mouthpiece, said rotatable mouthpiece rotatably mounted along the axis of said side edge and jointly rotating with said rotatable earpiece.

6. The portable electronic device according to claim 1, wherein said portable electronic device includes electrical circuitry, wherein at least a portion of said electrical circuitry is powered on in response to a rotation of said rotatable earpiece from the first position to the second position, and wherein the at least a portion of said electrical circuitry is powered off in response to a rotation of said rotatable earpiece from the second position to the first position.

7. The portable electronic device according to claim 1, wherein said portable electronic device includes electrical circuitry for receiving incoming calls and maintaining connected calls, wherein said electrical circuitry connects an incoming call in response to a rotation of said rotatable earpiece from the first position to the second position, and wherein said electrical circuitry disconnects a connected call in response to a rotation of said rotatable earpiece from the second position to the first position.

8. The portable electronic device according to claim 1, wherein said rotatable earpiece includes an earpiece side edge, and wherein said rotatable earpiece is constructed such that said earpiece side edge is substantially flush with said side edge when in the first position.

9. The portable electronic device according to claim 1, further comprising:

a pivotably mounted antenna, said pivotably mounted antenna having a first position and a second position, said pivotably mounted antenna positioned along said body when in the first position, said pivotably mounted antenna extending outward from said body when in the second position.

10. The portable electronic device according to claim 1, further comprising:

a microphone, said microphone disposed in said body and outwardly directed from said side edge; and a keypad, said keypad carried on said body and viewable from said front surface.

11. The portable electronic device according to claim 1, further comprising:

a display, said display carried on said body and viewable from said front surface.

12. The portable electronic device according to claim 1, further comprising:

a speaker, said speaker disposed in said rotatable earpiece.

13. The portable electronic device according to claim 1, wherein said rotatable earpiece forms a substantially concave shape.

14. The portable electronic device according to claim 1, wherein said rotatable earpiece forms a substantially convex shape.

15. A portable communication device, comprising:

a body, said body defining a front surface, a first side edge, a second side edge, a top end, and a bottom end;

a keypad, said keypad carried on said body and viewable from said front surface;

a microphone, said microphone outwardly directed from said first side edge and positioned near said bottom end; and a rotatable earpiece, said rotatable earpiece rotatably mounted along said first side edge near said top end, said rotatable earpiece outwardly directed away from said front surface when in a first position, said rotatable earpiece outwardly directed away from said first side edge when in a second position.

16. The portable communication device according to claim 15, further comprising:

an antenna, said antenna connected to said body, said antenna outwardly extending from said top end and positioned near said second side edge.

17. The portable communication device according to claim 15, further comprising:

a speaker, said speaker disposed in said rotatable earpiece.

18. The portable communication device according to claim 15, further comprising:

an antenna, said antenna connected to said body and outwardly extending from said top end.

19. The portable communication device according to claim 15, wherein said rotatable earpiece has a substantially circular and concave shape.

* * * * *